United States Patent
Huang et al.

(10) Patent No.: US 10,233,077 B2
(45) Date of Patent: Mar. 19, 2019

(54) PHOTOCATALYSIS-INDUCED PARTIAL OXIDATION OF METHANOL REFORMING PROCESS FOR PRODUCING HYDROGEN

(71) Applicant: National Tsing Hua University, Hsinchu (TW)

(72) Inventors: Yuh-Jeen Huang, Hsinchu (TW); Yi-Chun Liao, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 16/022,609

(22) Filed: Jun. 28, 2018

(65) Prior Publication Data

US 2018/0305206 A1 Oct. 25, 2018

Related U.S. Application Data

(62) Division of application No. 14/754,711, filed on Jun. 30, 2015, now abandoned.

(30) Foreign Application Priority Data

Apr. 17, 2015 (TW) .............................. 104112411 A (51) Int. Cl.
| | | |
|---|---|---|
| *C01B 3/32* | (2006.01) | |
| *B01J 35/00* | (2006.01) | |
| *B01J 23/89* | (2006.01) | |
| *B01J 19/12* | (2006.01) | |
| *B01J 37/03* | (2006.01) | |
| *B01J 37/08* | (2006.01) | |
| *B01J 37/02* | (2006.01) | |

(52) U.S. Cl.
CPC ............. *C01B 3/326* (2013.01); *B01J 19/127* (2013.01); *B01J 23/8953* (2013.01); *B01J 35/004* (2013.01); *B01J 35/006* (2013.01); *B01J 37/0201* (2013.01); *B01J 37/035* (2013.01); *B01J 37/088* (2013.01); *B01J 2523/00* (2013.01); *C01B 2203/0261* (2013.01); *C01B 2203/1041* (2013.01); *C01B 2203/1076* (2013.01); *C01B 2203/1082* (2013.01); *C01B 2203/1223* (2013.01); *Y02P 20/52* (2015.11)

(58) Field of Classification Search
CPC .. B01J 23/8926; B01J 23/8953; B01J 35/004; B01J 35/0006; C01B 3/326; C01B 3/323
See application file for complete search history.

(56) References Cited

PUBLICATIONS

Huang et al, "The effect of gold on the copper-zinc oxides catalyst during the partial oxidation of methanol reaction", 2011, International Journal of Hydrogen Energy, 36, 15203-15211 (Year: 2011).*

* cited by examiner

*Primary Examiner* — James A Fiorito
(74) *Attorney, Agent, or Firm* — JCIPRNET (57) ABSTRACT

A photocatalyst partial oxidation of methanol reforming process can be rapidly started via the use of a photocatalytic reaction at a reaction temperature below 150° C., and hydrogen having a low carbon monoxide content is produced at a high methanol conversion rate.

6 Claims, 5 Drawing Sheets

PHOTOCATALYSIS-INDUCED PARTIAL OXIDATION OF METHANOL REFORMING PROCESS FOR PRODUCING HYDROGEN

CROSS-REFERENCE TO RELATED APPLICATION

This application is a divisional application of and claims the priority benefit of U.S. application Ser. No. 14/754,711, filed on Jun. 30, 2015, which claims the priority benefit of Taiwan application serial no. 104112411, filed on Apr. 17, 2015. The entirety of the above-mentioned patent application is hereby incorporated by reference herein and made a part of this specification.

BACKGROUND OF THE INVENTION

Field of the Invention

The invention relates to a process for producing hydrogen, and also relates to a photocatalysis-induced partial oxidation of methanol reforming process for producing hydrogen.

Description of Related Art

Hydrogen is an environmentally friendly clean energy and renewable energy, and the hydrogen fuel cell is one of the green power-generating tools that are both environmentally friendly and has the most potential in practical application. However, since the transportation and storage of hydrogen are difficult, the conversion of a hydrocarbon compound into hydrogen as fuel for a proton exchange membrane fuel cell (PEMFC) can effectively solve this problem. In particular, methanol reforming for producing hydrogen is widely studied because methanol has the advantages of high chemical activity, large production yield, and low costs. The methanol reforming reaction for producing hydrogen includes, for instance, a partial oxidation reaction of methanol, a methanol water vapor reforming reaction, and a methanol decomposition reaction.

In particular, methanol water vapor reforming is a strong endothermic reaction that requires a large amount of heat from an outside source and has a slow reaction speed. A partial oxidation reaction of methanol (POM) generally requires a relatively high temperature (>200° C.), and a copper-zinc catalyst is used for ignition. Not only are operating costs higher, the demand for rapidly starting the battery of an electronic product equipment (such as a personal electronic product) also cannot be met.

SUMMARY OF THE INVENTION

Therefore, in the invention, a photocatalyst can be rapidly started to perform a partial oxidation of methanol reforming process via the photocatalytic reaction of the photocatalyst at a reaction temperature below 150° C., and hydrogen having low carbon monoxide (CO) content can be produced at a high methanol conversion rate.

An embodiment of the invention provides a partial oxidation of methanol reforming process, at least comprising providing a mixed gas containing methanol and oxygen; performing an illumination step; and passing the mixed gas through a catalyst material to perform a partial oxidation of methanol reforming reaction to obtain hydrogen after the illumination step is performed, wherein the volume ratio of methanol and oxygen is 1:2, the illumination step is performed with a light beam having a wavelength range of 377 nm to 800 nm and the irradiation time is 5 minutes to 20 minutes, wherein the ignition temperature of the mixed gas passing through the catalyst material to perform the partial oxidation of methanol reforming reaction is less than about 150° C., wherein the catalyst material component comprises gold-copper and zinc oxide (AuCu/ZnO) and the zinc oxide is used as a support. The copper content in the catalyst material is 20 wt % to 50 wt % relative to the total weight of the catalyst material, and the gold content in the catalyst material is 1 wt % to 10 wt % relative to the total weight of the catalyst material.

An embodiment of the invention provides a photocatalyst material for a photocatalytic partial oxidation of methanol reforming process, wherein the photocatalyst material comprises gold-copper and zinc oxide (AuCu/ZnO) and the zinc oxide with or without oxygen vacancy is used as a support, the copper content in the photocatalyst material is 20 wt % to 50 wt % relative to the total weight of the catalyst, the gold content in the photocatalyst material is 1 wt % to 10 wt % relative to the total weight of the photocatalyst material, the zinc oxide with oxygen vacancy is formed by calcining zinc oxide under nitrogen for 1.5 hours and calcining in the air for 0.5 hours at a calcination temperature of 400° C. to 600° C., and the oxygen vacancy content in the zinc oxide with oxygen vacancy is 1% to 7%.

In order to the make aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The overall partial oxidation reaction of methanol is still a complex reaction system, and according to different catalysts and reaction conditions adopted, methanol can go through different reactions, including, for instance, methanol combustion, steam reforming, and decomposition. The overall reaction of the partial oxidation of methanol for producing hydrogen can be simply represented with the following formula:

$$CH_3OH + 0.5O_2 \rightarrow CO_2 + 2H_2$$

Zinc oxide (ZnO) is one of the common photocatalysts, and has advantages such as high stability, low pollution, and low cost. However, the hydrogen-producing efficiency of the zinc oxide photocatalyst is low, mainly due to (1) the energy release via electron-hole pair recombination generated by photoexcitation; and (2) the energy level of ZnO is about 3.37 eV (at room temperature), and visible light cannot be effectively utilized. The copper-zinc alloy catalysts are also common catalysts for partial oxidation of methanol, and have the advantages of low CO selectivity and high hydrogen production capability compared to a precious metal catalyst. However, the thermal stability of the copper-zinc catalysts is lower.

In the invention, gold particles are added to modify the copper-zinc catalyst(s) (zinc oxide or zinc oxide with oxygen vacancy is used as a support) into a photocatalyst material, which triggers a partial oxidation of methanol reforming process (a photocatalysis-induced process) for producing hydrogen. Since gold is a photosensitive substance, gold has the property of adjusting surface plasma resonance at a visible light absorption band of about 520 nm, and is able to provide local-field enhancement effect, resonant coupling effect, fluorescent properties, and good stability, therefore reducing the energy level for the electron acceptor of the modified photocatalyst, improving the efficiency of the photocatalytic methanol reaction for producing hydrogen, and increasing the photocatalytic effect.

In the invention, a gold-copper-zinc (AuCu/ZnO) catalyst is used in conjunction with an illumination step to perform a photocatalytic catalyst, so as to catalyze the partial oxidation reaction of methanol to produce a hydrogen-rich gas. In the invention, the use of a photocatalyst in an illumination step can effectively reduce the ignition temperature of the POM reaction and still allow the POM reaction to have the advantages of high methanol conversion rate ($C_{MeOH}$) and low CO selectivity ($S_{CO}$).

Preparation of Catalyst Material

The synthesis of catalyst is mainly divided into two steps. First, through co-precipitation, a mixture of precursors copper nitrate and zinc nitrate (weight percentage 30:70) is dissolved in an aqueous solution of 70° C., and a 2M sodium bicarbonate aqueous solution is rapidly added thereto. During the reaction, when the pH value reaches 7 to 8, a light blue precipitate is formed. After the precipitate is dried at 105° C., through deposition precipitation, the precursor of gold, tetrachloroauric acid, is added dropwise, and the pH value is controlled at 7 using sodium carbonate and a 10% hydrochloric acid solution. The reaction is stopped after the pH value is stabilized (about one hour). The collected precipitate is filtered and calcinated in the air at 400° C. for two hours to obtain a gold-copper-zinc catalyst ($Au_xCu/ZnO$, experiment code "AxCZ", wherein x is the weight percentage of gold in the total weight of the gold-copper-zinc catalyst material and x is preferably between 1 and 10). For instance, "A4CZ" represents 4 wt % of gold in the total weight of the gold-copper-zinc catalyst material, 30 wt % of copper in the total weight of the gold-copper-zinc catalyst material, and 66 wt % of oxygen in the total weight of the gold-copper-zinc catalyst material, which sums to a total of 100 wt %. For instance, "A2CZ", "A3CZ", and "A4CZ" can be further written as $Au_2Cu_{30}/ZnO$, $Au_3Cu_{30}/ZnO$, and $Au_4Cu_{30}/ZnO$. For these catalyst materials, zinc oxide (ZnO) generally refers to zinc oxide having no (without) oxygen vacancy, as zinc oxide has to be specially treated under certain conditions to obtain zinc oxide with oxygen vacancy (v-ZnO) as described in the following paragraphs.

Moreover, a copper-zinc catalyst material used as a comparative example is prepared, and the preparation method thereof includes dissolving zinc nitrate and copper nitrate (zinc:copper weight percentage is 70:30) in water, stirring at 70° C., and controlling the pH value to 7 using a 2M sodium carbonate solution and then stopped. At this point, the solution pH value continues to rise until the pH is 8 and the reaction is stopped. Then, 2 L of water is used for cleaning and filtering, and lastly, calcination is performed at 400 degrees for 4 hours in the air to obtain a copper-zinc catalyst material (CuZnO; experiment code "CZ").

Figure 1:
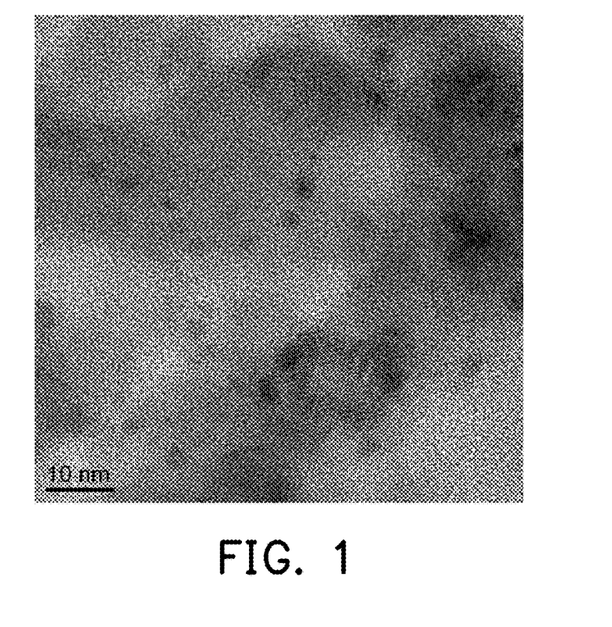
FIG. 1 is a TEM micrograph of a gold-copper-zinc catalyst material.
Figure 2:
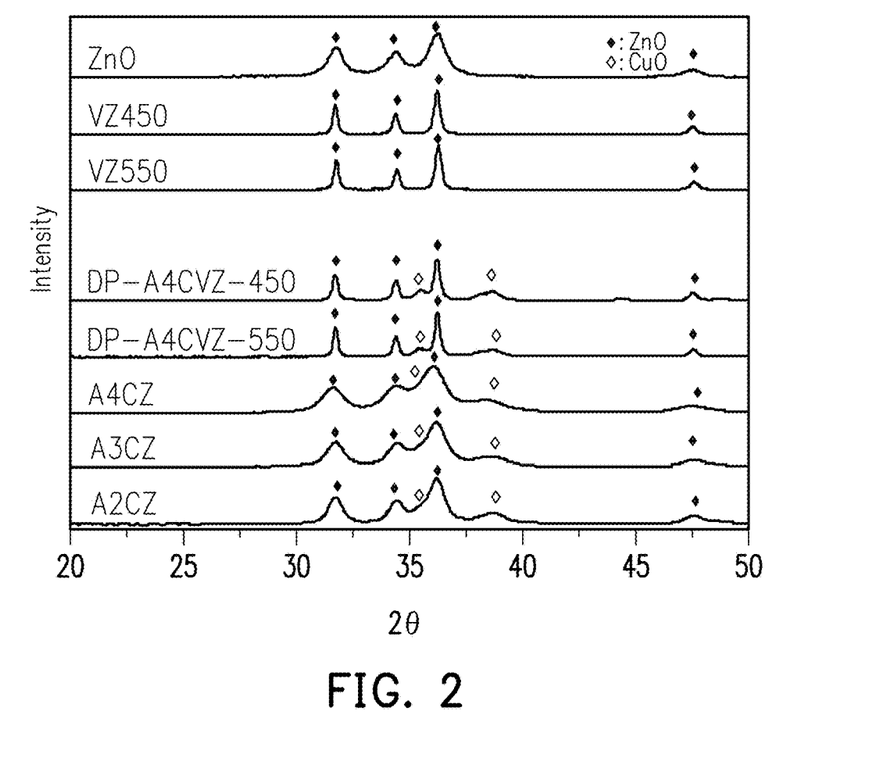
FIG. 2 is an X-ray diffractometer spectrum of a gold-copper-zinc catalyst material and a gold-copper-zinc catalyst material with oxygen vacancy.

FIG. 1 is a TEM micrograph of the prepared gold-copper-zinc catalyst material. It can be seen from the TEM micrograph of FIG. 1 that the gold particle size in the gold-copper-zinc catalyst material is about 2 nm to about 4 nm. FIG. 2 is an X-ray diffractometer spectrum of the prepared gold-copper-zinc catalyst material and gold-copper-zinc catalyst material with oxygen vacancy. It can be seen from the X-ray diffractometer spectrum of FIG. 2 that the particle size of zinc oxide in the gold-copper-zinc catalyst material is about 9 nm to about 12 nm, and the particle size of copper oxide is about 4 nm to about 7 nm (the calculated size data is as shown in Table 1 below). Regarding the proportion of the gold-copper-zinc catalyst, the content of copper in gold-copper-zinc is 20 wt % to 50 wt %, the content of gold in gold-copper-zinc is 1 wt % to 10 wt %, preferably 4 wt % to 10 wt %, and the particle size of gold particles in the catalyst is not greater than 5 nm, wherein a reduction pretreatment can be optionally performed on the catalyst. The gold content in the photocatalyst material is 4 wt % to 10 wt % relative to the total weight of the photocatalyst material, and the ignition temperature of the photocatalyst material in the partial oxidation of methanol reforming reaction is less than or equal to 120° C.

The deposition precipitation is mainly used to synthesize of the catalyst material of zinc oxide with oxygen vacancy. Taking a gold-copper-zinc catalyst material with oxygen vacancy as an example, first, a starting material of 0.25 M zinc chloride and 0.00025 M SDS is mixed with 0.5 M bicarbonate (used as the precipitating agent), and the mixture is stirred at room temperature for two hours to obtain zinc oxide. Then, calcination is performed to the zinc oxide under nitrogen for 1.5 hours and then in the air for 0.5 hours respectively at calcination temperatures of 450° C. and 550° C. to synthesize zinc oxide with oxygen vacancy, and the content of oxygen vacancy in zinc oxide may be adjusted by using different calcination temperatures. A higher calcination temperature represents a higher oxygen vacancy content in zinc oxide (an oxygen vacancy content of 1% to 7% is preferred). After the zinc oxide with oxygen vacancy (v-ZnO; experiment code "vZ") is formed, copper nitrate and tetrachloroauric acid are respectively added dropwise using the above methods, and the pH value is controlled at 7 using sodium carbonate and a 10% hydrochloric acid solution. After the pH value is stabilized (about one hour), the reaction is stopped. The collected precipitate is filtered, and calcination is performed again under nitrogen and then in the air at a calcination temperature of 450° C. for two hours to obtain a gold-copper-zinc catalyst with oxygen vacancy ($Au_xCu/v$-ZnO (zinc oxide with oxygen vacancy), experiment code "AxCvZ", wherein x is the weight percentage of gold in the total weight of the gold-copper-zinc catalyst material, and x is preferably between 1 and 10); different gold-copper-zinc catalysts with oxygen vacancy are obtained using the calcination temperatures of 450° C. and 550° C., and the experiment codes thereof are respectively "DP-A4CvZ-450": prepared by a deposition precipitation method-Au/Cu/ZnO with oxygen vacancy-calcination temperature of 450° C., and "DP-A4CvZ-550": prepared by a deposition precipitation method-Au/Cu/ZnO with oxygen vacancy-calcination temperature of 550° C. For instance, "A4CvZ" represents 4 wt % of gold in the total weight of the gold-copper-zinc catalyst material with oxygen vacancy, 30 wt % of copper in the total weight of the gold-copper-zinc catalyst material, and 66 wt % of zinc oxide with oxygen vacancy in the total weight of the gold-copper-zinc catalyst material, which sums to a total of 100 wt %. The preparation synthesis method, conditions, and calcination temperature of the catalyst material synthesis are listed in Table 2. For the photocatalyst material of the zinc oxide with oxygen vacancy, regarding the proportion of the gold-copper-zinc catalyst, the content of copper in gold-copper-zinc is 20 wt % to 50 wt %, the content of gold in gold-copper-zinc is 1 wt % to 10 wt %, preferably 4 wt % to 10 wt %, the calcination temperature is preferably 400° C. to 600° C., and the oxygen vacancy content in the zinc oxide with oxygen vacancy is 1% to 7%. Using DP-A4CvZ-550 as an example, the oxygen vacancy content in the zinc oxide with oxygen vacancy prepared at a calcination temperature of 550° C. is 6% to 7%.

Figure 3:
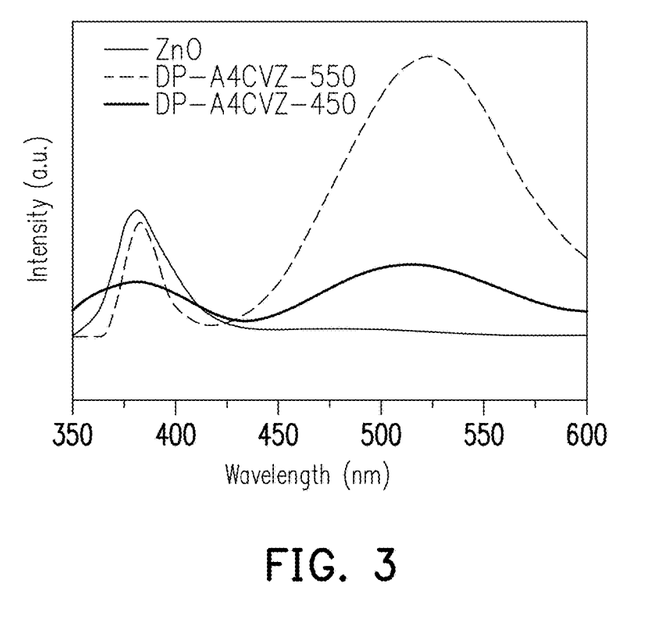
FIG. 3 is a photoluminescence (PL) spectra of zinc oxide and a gold-copper-zinc catalyst with oxygen vacancy.

It can be observed from the X-ray diffractometer spectrum of FIG. 2 that the particle size of zinc oxide in the nano catalyst material with oxygen vacancy is about 31 nm to about 36 nm, the particle size of copper oxide is about 7 nm to about 8 nm, and it is seen by observing the X-ray diffractometer spectrum and from the calculation that zinc oxide particles become larger after oxygen vacancy is formed via calcination, and are about 30 nm or greater. FIG. 3 shows a photoluminescence (PL) spectra of zinc oxide and a gold-copper-zinc catalyst with oxygen vacancy. It can be seen from FIG. 3 that the catalyst material of the zinc oxide with oxygen vacancy can emit fluorescence in the wavelength range of 450 nm to 600 nm. The calculation of the oxygen vacancy content is based on the ratio of 520 nm absorption height/377 absorption height of the fluorescence spectrum thereof.

TABLE 1

Particle sizes obtained via the calculation of x-ray diffractometer graph

| Catalyst | ZnO (101) Particle size (nm) | CuO (111) Particle size (nm) |
|---|---|---|
| ZnO | 11.4 | — |
| A4CZ | 9.5 | 4.0 |
| A3CZ | 10.8 | 4.2 |
| A2CZ | 12.4 | 6.7 |
| DP-A4CvZ-450 | 31.4 | 7.9 |
| DP-A4CvZ-550 | 36.6 | 8.4 |

TABLE 2

Calcination method and conditions of catalyst synthesis

| Catalyst name | Synthesis method | Calcination condition Nitrogen | Calcination condition Air |
|---|---|---|---|
| ZnO | Precipitation | — | 450° C., 2 hours |
| vZnO-450 | Precipitation | 450° C., 1.5 hours | 450° C., 0.5 hours |
| vZnO-550 | Precipitation | 550° C., 1.5 hours | 450° C., 0.5 hours |
| DP-AxCvZ-450 | Deposition precipitation | 450° C., 1.5 hours | 450° C., 0.5 hours |
| DP-AxCvZ-550 | Deposition precipitation | 450° C., 1.5 hours | 450° C., 0.5 hours |
| CuZnO (CZ) | Coprecipitation | — | 400° C., 4 hours |
| AxCZ | Deposition precipitation | — | 400° C., 2 hours |

EXAMPLE

Photocatalytic Partial Oxidation of Methanol Reforming Reaction

Figure 4:
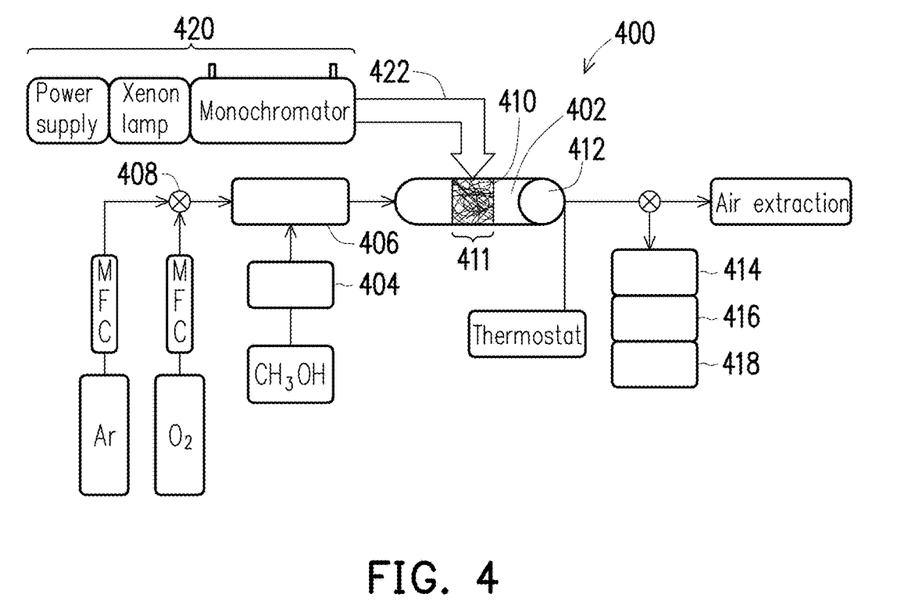
FIG. 4 is a schematic layout design of a methanol reforming reaction system for producing hydrogen.

FIG. 4 is a schematic of a methanol reforming reaction system for producing hydrogen. As shown in FIG. 4, in a fixed bed reactor or an adiabatic reactor 400, 0.1 g of a catalyst sample (60 mesh to 80 mesh) is first placed in a quartz reaction tube having an inner diameter of 4 mm, and a quartz wool fixed catalyst 410 is used to form a catalyst bed 411. In terms of reaction gas, a liquid pump 404 is used to control the flow of the aqueous solution of methanol and the aqueous methanol solution is vaporized via a preheater 406; the flow rates of oxygen and a carrier gas (such as Ar) are respectively controlled by a mass flow controller 408, and the oxygen and carrier gas are introduced into a mixing tank 402 together with methanol and water vapor and uniformly mixed (6.1% $O_2$, 12.2% $CH_3OH$, 81.7% Ar; $nO_2/nCH_3OH=0.5$), and then the mixed gas is purged through the catalyst bed 411 of the adiabatic reactor. The photocatalytic light source 420 may use a white light source having a wavelength range of 377 nm to 800 nm, the power range thereof is between 180 W and 220 W, and the light beam of the light source is directly irradiated on the catalyst bed via an optical fiber 422. The irradiation distance is, for instance, 1 mm, and heating is performed within a furnace tube 412 at the same time to provide sufficient heat until the catalyst is ignited. After 5 minutes to 20 minutes, the light source is turned off, and qualitative separation of the reaction products is achieved by gas chromatography (GC) through a thermal conductivity detector (TCD)-gas chromatograph 414, and hydrogen ($H_2$) and carbon monoxide (CO) are separated by a molecular sieve 5A chromatographic column 416; and water, carbon dioxide ($CO_2$), and methanol ($CH_3OH$) are separated via a Porapak Q chromatographic column 418, and quantitative analysis is done by using the thermal conductivity detector of the thermal conductivity detector (TCD)-gas chromatograph 414.

After the quantitative analysis is performed via the thermal conductivity detector, methanol conversion rate $C_{MeOH}$, hydrogen selectivity ($S_{H2}$), and CO selectivity ($S_{CO}$) are calculated, and the quantitative analysis indices are as defined below:

$$C_{MeOH} = (n_{MeOH,in} - n_{MeOH,out})/n_{MeOH,in} \times 100\%$$

$$S_{H2} = n_{H2}/n_{H2} + n_{H2O} \times 100\%$$

$$S_{CO} = n_{CO}/(n_{CO2} + n_{CO}) \times 100\%$$

$$R_{H2} = n_{H2}/(n_{MeOH,in} - n_{MeOH,out})$$

In particular, $n_{H2}$ and $n_{H2O}$ are respectively hydrogen in moles and water vapor in moles; $n_{CO}$ and $n_{CO2}$ are respectively CO in moles and $CO_2$ in moles; and $n_{MeOH,in}$ and $n_{MeOH,out}$ are respectively methanol inflow in moles and methanol outflow in moles.

Photocatalytic Catalyst Reaction

A mixed gas of methanol and water vapor (oxygen:methanol volume ratio is 1:2) is introduced into a reactor, and a partial oxidation reaction of methanol is performed under the catalysis of the gold-copper-zinc catalyst material. The gas is introduced with an illumination process, and the light beam provided by an illumination light source is directly irradiated on the catalyst bed to photocatalyze the catalyst. Then, the reaction is performed and the reaction region is heated within a furnace tube at the same time so as to provide sufficient heat until the catalyst is ignited. The illumination time and the heating conditions may be varied for different gold-copper-zinc photocatalyst materials to perform the photocatalytic partial oxidation reaction of methanol to measure the catalyst activities such as the ignition temperature, the methanol conversion rate ($C_{OV}$), the hydrogen selectivity ($S_{H2}$), and the CO selectivity ($S_{CO}$) obtained from different reaction conditions. The photocatalytic catalyst reaction of the invention can utilize a suitable catalytic light (the wavelength range from 377 nm to 800 nm and light source power range between 180 W and 220 W) according to the gold-copper-zinc catalyst material used and the reaction conditions.

Figure 5:
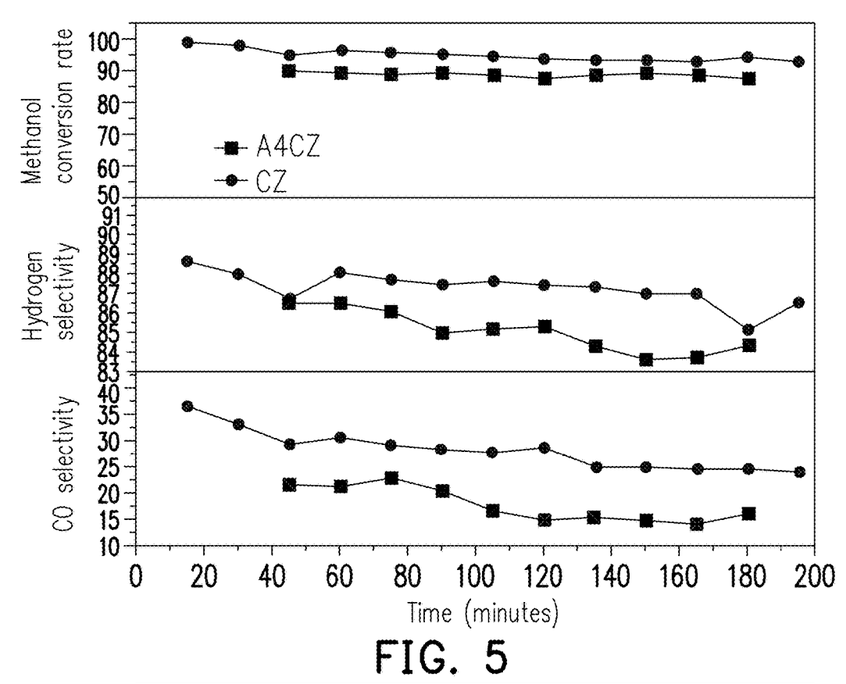
FIG. 5 illustrates the comparison of methanol conversion rate ($C_{OV}$), hydrogen selectivity ($S_{H2}$), and CO selectivity ($S_{CO}$) of a copper-zinc catalyst material and a gold-copper-zinc catalyst material catalyzing a partial oxidation of methanol reforming reaction without illumination and with heat continuously provided from an outside source.
Figure 6:
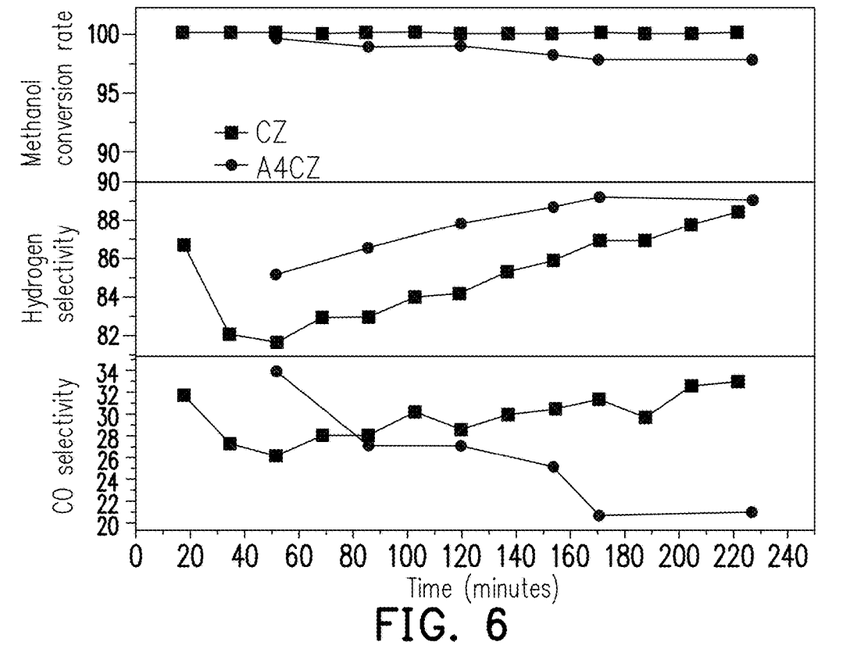
FIG. 6 illustrates the comparison of methanol conversion rate ($C_{OV}$), hydrogen selectivity ($S_{H2}$), and CO selectivity ($S_{CO}$) of a copper-zinc catalyst material and a gold-copper-zinc catalyst material catalyzing a partial oxidation of methanol reforming reaction in which the light source is turned off after 10 minutes of illumination and heat is continuously provided to keep the outside temperature the same as the ignition temperature.
Figure 7:
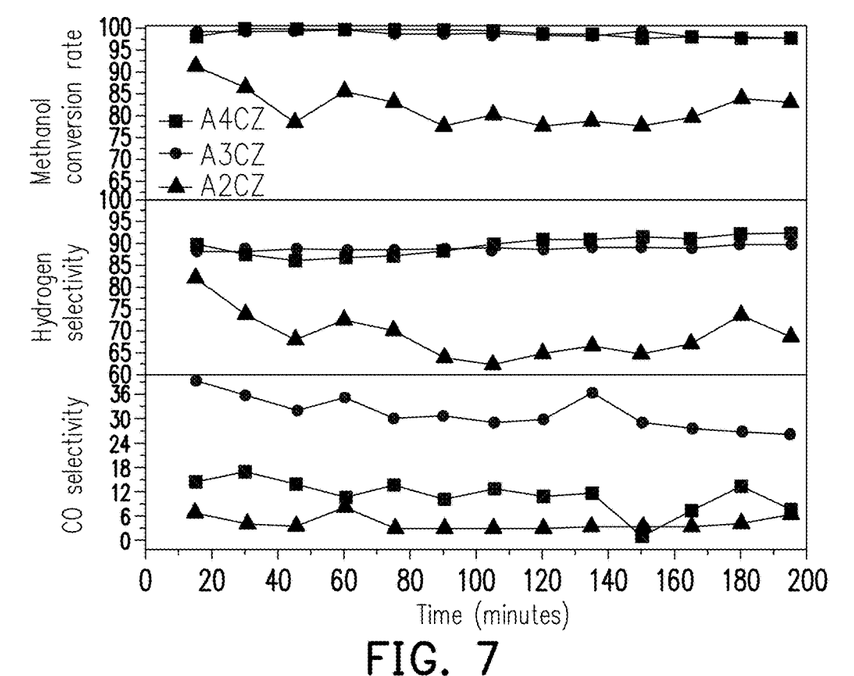
FIG. 7 illustrates the comparison of methanol conversion rate ($C_{OV}$), hydrogen selectivity ($S_{H2}$), and CO selectivity ($S_{CO}$) of a gold-copper-zinc catalyst material having different gold contents catalyzing a partial oxidation of methanol reforming reaction in which the light source is turned off after 10 minutes of illumination and heat is continuously provided to keep the outside temperature the same as the ignition temperature.

FIG. 5 shows methanol conversion rate ($C_{OV}$), hydrogen selectivity ($S_{H2}$), and CO selectivity ($S_{CO}$) of the copper-zinc catalyst material (CZ) and the gold-copper-zinc catalyst material (A4CZ) catalyzing a methanol POM reaction under the reaction condition that the mixed gas has an oxygen to alcohol ratio of 0.5 and under the conditions of no illumination and continuous heating from an outside source. FIG. 6 shows methanol conversion rate ($C_{OV}$), hydrogen selectivity ($S_{H2}$), and CO selectivity ($S_{CO}$) of the copper-zinc catalyst material (CZ) and the gold-copper-zinc catalyst material (A4CZ) catalyzing a methanol POM reaction under the reaction condition that the mixed gas has an oxygen to alcohol ratio of 0.5 and under the conditions that the light source is turned off after 10 minutes of illumination and heating is continuously provided to keep the outside temperature the same as the ignition temperature. FIG. 7 shows methanol conversion rate ($C_{OV}$), hydrogen selectivity ($S_{H2}$), and CO selectivity ($S_{CO}$) of the gold-copper-zinc catalyst material having different gold contents catalyzing the methanol POM reaction under the reaction condition that the mixed gas has an oxygen to alcohol ratio of 0.5 and under the conditions that the light source is turned off after 10 minutes of illumination and heating is continuously provided to keep the outside temperature the same as the ignition temperature.

The results of FIGS. 5 to 6 show that under the condition of no illumination, the catalytic partial oxidation reactions of methanol (POM) of the copper-zinc catalyst material (CZ) and the gold-copper-zinc catalyst material (A4CZ) respectively need to reach a reaction temperature of 170° C. and 100° C. to start catalysis (i.e., the ignition temperature), the equilibrium temperatures of the reaction are respectively at about 170° C. and about 155° C., and both can reach a methanol conversion rate of 90% or above (as shown on the top of FIG. 5). In the present research, a photocatalytic partial oxidation reaction of methanol is performed to the prepared copper-zinc catalyst material (CZ) and gold-copper-zinc catalyst material (A4CZ) as an activity assay. The light source is turned off after 5 minutes to 20 minutes of illumination, and it is seen that the illumination step effectively reduces the ignition temperature, and the ignition temperatures of the copper-zinc catalyst material (CZ) and the gold-copper-zinc catalyst material (A4CZ) in the POM reaction are respectively reduced to 150° C. and 70° C. (refer to FIG. 6 for other catalyst activity parameters). If outside ambient temperature is kept the same as the ignition temperature (continuous heating), after 200 minutes, the gold-copper-zinc catalyst (A4CZ) can still self-sustain an equilibrium temperature of about 170° C., and have a methanol conversion rate of 95% or above and a hydrogen selectivity of 90% (as shown in FIG. 6). Moreover, the ignition temperature is reduced as the additive amount of gold is increased (refer to FIG. 7). The amount of gold contained in the catalyst material is altered in the testing assay, such that when the content of gold is increased to about 10% (A10CZ), even the ignition at room temperature can be achieved. The above results show that, the copper-zinc catalyst(s) with added gold can effectively improve the photocatalytic effect, and when applied in a photocatalytic partial oxidation of methanol reforming reaction, such catalysts can effectively reduce the ignition temperature and achieve better catalytic efficacy. The ignition temperature, the equilibrium temperature, and the ambient temperature of different catalyst materials tested in FIGS. 5 to 7 are as shown in Table 3.

TABLE 3

| Catalyst material | Ignition temperature | Equilibrium temperature | Illumination | Ambient temperature |
|---|---|---|---|---|
| CZ | 170° C. | 170° C. | None | Equivalent to equilibrium temperature |
| A4CZ | 100° C. | 155° C. | None | Equivalent to equilibrium temperature |
| CZ | 150° C. | 222° C. | 10 minutes | Equivalent to ignition temperature |
| A4CZ | 70° C. | 170° C. | 10 minutes | Equivalent to ignition temperature |
| A2CZ | 90° C. | 193° C. | 10 minutes | Equivalent to ignition temperature |
| A3CZ | 80° C. | 205° C. | 10 minutes | Equivalent to ignition temperature |
| A10CZ | Room temperature | 200° C. | 10 minutes | Room temperature |

Figure 8:
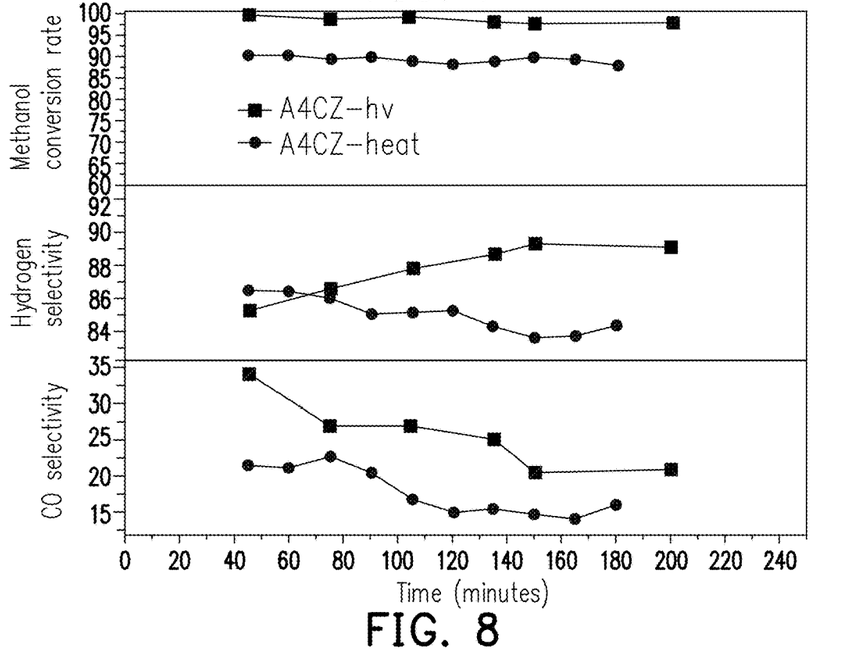
FIG. 8 illustrates the comparison of methanol conversion rate ($C_{OV}$), hydrogen selectivity ($S_{H2}$), and CO selectivity ($S_{CO}$) of a gold-copper-zinc catalyst material catalyzing a partial oxidation of methanol reforming reaction under different reaction conditions.

FIG. 8 shows methanol conversion rate ($C_{OV}$), hydrogen selectivity ($S_{H2}$), and CO selectivity ($S_{CO}$) of a gold-copper-zinc catalyst material (A4CZ) catalyzing a methanol POM reaction under different reaction conditions. In particular, A4CZ-hv represents catalyst activity of the gold-copper-zinc catalyst material (A4CZ) obtained by measuring under the conditions in which the light source is turned off after 10 minutes of illumination but outside temperature is kept the same as an ignition temperature of 70° C. A4CZ-heat represents catalyst activity of the copper-zinc catalyst material (A4CZ) obtained under the conditions in which the ignition temperature is reached by heating and heat is continuously provided to keep the ambient temperature at an ignition temperature of 100° C. The experimental results of FIG. 8 show that the ignition temperature (70° C.) of the gold-copper-zinc catalyst material (A4CZ) after illumination is less than the ignition temperature (100° C.) without an illumination step, and the methanol conversion rate of the gold-copper-zinc catalyst material (A4CZ) reaches 95% and the hydrogen selectivity thereof reaches 90% after illumination.

Figure 9:
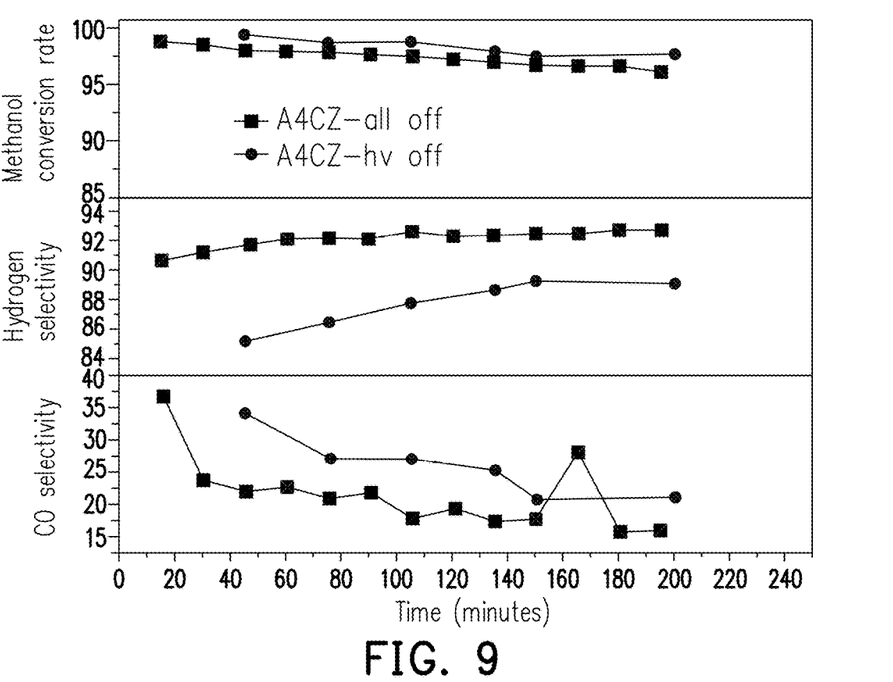
FIG. 9 illustrates the comparison of methanol conversion rate ($C_{OV}$), hydrogen selectivity ($S_{H2}$), and CO selectivity ($S_{CO}$) of a gold-copper-zinc catalyst material catalyzing a partial oxidation of methanol reforming reaction under different reaction conditions.

To detect whether the activity of the catalyst can still be maintained after ignition via illumination, external energy is further turned off after ignition of the catalyst, such that the catalyst is homeostatic without any light source and heat source. FIG. 9 shows methanol conversion rate ($C_{OV}$), hydrogen selectivity ($S_{H2}$), and CO selectivity ($S_{CO}$) of a gold-copper-zinc catalyst material (A4CZ) catalyzing a methanol POM reaction under different reaction conditions. In particular, "A4CZ-all off" represents catalyst activity of the gold-copper-zinc catalyst obtained under the conditions in which the light source and the heat are turned off after 10 minutes of illumination (no continuous heating). "A4CZ-hv off" represents catalyst activity of the gold-copper-zinc catalyst obtained under the conditions in which the light source is turned off after 10 minutes of illumination but the outside ambient temperature is kept the same as an ignition temperature of 70° C. The experimental results of FIG. 9 show that when external heat source is turned off after ignition via illumination and after 200 minutes of equilibrium, the activity of the gold-copper-zinc catalyst (A4CZ) can still be sustained, the equilibrium temperature is kept at 124° C., the methanol conversion rate reaches 95%, and the hydrogen selectivity is 90% or above.

Figure 10:
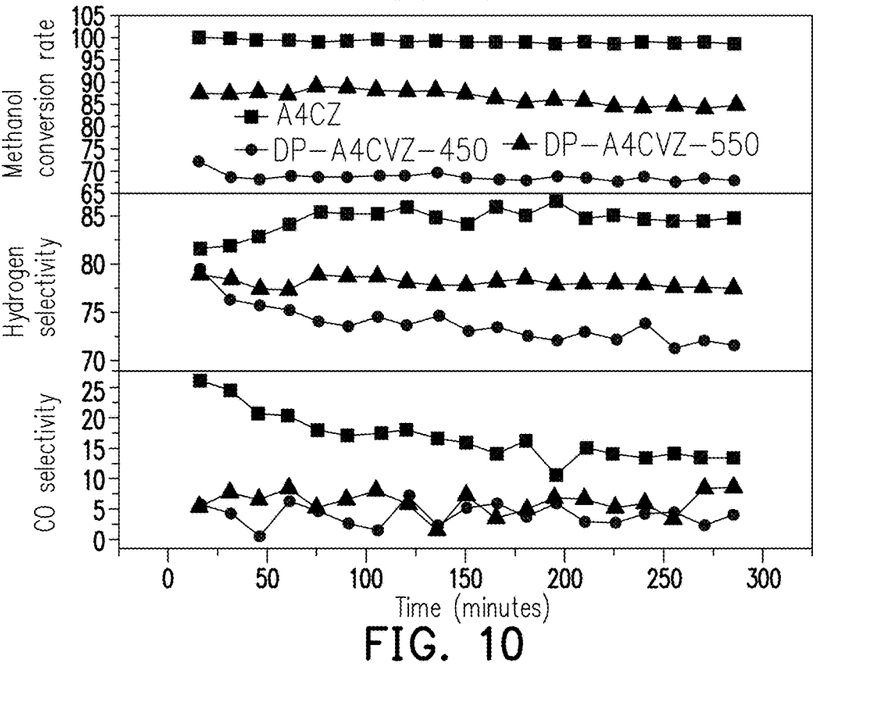
FIG. 10 illustrates the comparison of methanol conversion rate ($C_{OV}$), hydrogen selectivity ($S_{H2}$), and CO selectivity ($S_{CO}$) of a gold-copper-zinc catalyst material with oxygen vacancy catalyzing a partial oxidation of methanol reforming reaction in which the light source and the heat are turned off after 10 minutes of illumination (no continuous heating).

The prepared gold-copper-zinc catalyst materials ("DP-A4CvZ-450" and "DP-A4CvZ-550" catalysts) of the zinc oxide with oxygen vacancy are further tested. FIG. 10 shows methanol conversion rate ($C_{OV}$), hydrogen selectivity ($S_{H2}$), and CO selectivity ($S_{CO}$) of the gold-copper-zinc catalyst material with oxygen vacancy analogous to A4CZ catalyzing a methanol POM reaction under the condition that the light source and the heat are turned off after 10 minutes of illumination (no continuous heating). It is known from the results of FIG. 10 that although the ignition temperature of the catalyst with oxygen vacancy is higher, CO selectivity ($S_{CO}$) can be effectively reduced, and the DP-A4CvZ-550 catalyst material can even reduce CO selectivity to 5%. Therefore, if the production of CO of the methanol POM reaction is to be reduced, the oxygen vacancy content of zinc oxide can be adjusted using the calcination temperature to prepare a modified gold-copper-zinc catalyst (i.e., a gold-copper-zinc catalyst material having the zinc oxide with oxygen vacancy). The modified gold-copper-zinc catalyst material is then used to perform a photocatalytic reaction. Not only can the ignition temperature be reduced to prevent the use of a high-temperature equipment so as to achieve the effect of energy reduction, the object of a low amount of CO production can further be achieved.

The ignition temperature and the equilibrium temperature of different catalyst materials tested in FIGS. 8 to 10 are as shown in Table 4.

TABLE 4

| Catalyst material | Ignition temperature | Equilibrium temperature | Illumination | Ambient temperature |
|---|---|---|---|---|
| A4CZ-hv | 70° C. | 168° C. | 10 minutes | Equivalent to ignition temperature |
| A4CZ-heat | 100° C. | 155° C. | None | Equivalent to equilibrium temperature |
| A4CZ-all off | 70° C. | 124° C. | 10 minutes | Room temperature |
| A4CZ-hv off | 70° C. | 168° C. | 10 minutes | Equivalent to ignition temperature |
| DP-A4CvZ-450 | 140° C. | 176° C. | None | Equivalent to equilibrium temperature |
| DP-A4CvZ-550 | 140° C. | 200° C. | None | Equivalent to equilibrium temperature |
| DP-A4CvZ-450 | 110° C. | 145° C. | 10 minutes | Room temperature |
| DP-A4CvZ-550 | 120° C. | 151° C. | 10 minutes | Room temperature |

The gold-copper-zinc catalyst prepared in the invention can achieve a relatively high hydrogen production efficiency at a low operating temperature effectively by photocatalysis. Moreover, a novel catalyst material having high photocatalytic activity, lower operating temperature, and little production of CO is prepared in the present application, and the catalyst material can be applied in a heterogeneous catalyst catalytic system or an optoelectronic photocatalytic system, including fields such as the oil industry, fuel cell technology, and hydrogen economic development, and can convert methanol into hydrogen with a high efficiency. For the current demands of small in volume, portability, and as an energy source that can be combined with a semiconductor as desired by the electronics industry, if the current catalyst reforming system for producing hydrogen can be simplified and made suitable for operating at room temperature, then the proton exchange membrane fuel cell using hydrogen as fuel may very likely be developed as the power source of personal computers, mobile phones, and mobile power sources in the future.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A photocatalytic reforming of partial oxidation of methanol process, comprising:
   providing a mixed gas containing methanol and oxygen, wherein a volume ratio of methanol and oxygen is 1:2; and
   passing the mixed gas through a catalyst material with an illumination process to perform a photocatalytic reforming of partial oxidation of methanol reaction to obtain hydrogen, wherein an ignition temperature of the mixed gas passing through the catalyst material to perform the photocatalytic reforming of partial oxidation of methanol reaction is less than about 150° C.,
wherein the illumination process is performed with a light beam having a wavelength range of 377 nm to 800 mn and an irradiation distance of 1 mm, an illumination time is 5 minutes to 20 minutes, and during the photocatalytic reforming of partial oxidation of methanol reaction, the light beam from a light source is directly irradiated onto a catalyst bed,
wherein the catalyst material comprises gold-copper and zinc oxide (AuCu/ZnO) and the zinc oxide is used as a support therein, a copper content in the catalyst material is 20 wt % to 50 wt % relative to a total weight of the catalyst material, and a gold content in the catalyst material is 1 wt % to 10 wt % relative to the total weight of the catalyst material.

2. The photocatalytic reforming of partial oxidation of methanol process of claim 1, wherein the ignition temperature of the mixed gas passing through the catalyst material to perform the photocatalytic reforming of partial oxidation of methanol reaction is less than about 100° C.

3. The photocatalytic reforming of partial oxidation of methanol process of claim 1, wherein the ignition temperature of the mixed gas passing through the catalyst material to perform the photocatalytic reforming of partial oxidation of methanol reaction is less than or equal to 70° C., and the gold content in the catalyst material is 4 wt % to 10 wt % relative to the total weight of the catalyst material.

4. The photocatalytic reforming of partial oxidation of methanol process of claim 3, wherein a methanol conversion of the catalyst material in the photocatalytic reforming of partial oxidation of methanol reaction reaches 95% or above and a hydrogen selectivity reaches 90% or above.

5. The photocatalytic reforming of partial oxidation of methanol process of claim 1, wherein a particle size of a gold particle in the catalyst material is about 2 nm to 4 nm.

6. The photocatalytic reforming of partial oxidation of methanol process of claim 1, wherein the zinc oxide in the catalyst material is zinc oxide with oxygen vacancy, wherein a particle size of the zinc oxide with oxygen vacancy in the catalyst material is greater than 30 nm, and an oxygen vacancy content in the zinc oxide with oxygen vacancy is 1% to 7%.

* * * * *